Patented June 23, 1936

2,045,153

UNITED STATES PATENT OFFICE 2,045,153

SOLUTIONS OF ALKALI METAL SILICATES

Paul C. Lemmerman and William K. Schweitzer, East Cleveland, Ohio, assignors to The Grasselli Chemical Company, Cleveland, Ohio, a corporation of Delaware No Drawing. Application December 1, 1933, Serial No. 700,614

3 Claims. (Cl. 134—23.92)

The present invention relates to aqueous solutions of alkali metal silicates containing small amounts of sulfation products of aliphatic alcohols containing more than 7 carbon atoms in the alcoholic radical.

The invention is particularly applicable to sodium and potassium silicate solutions and particularly to the concentrated solutions of a specific gravity of between about 15 and 60° Bé. and to compositions in which the molecular ratio of alkali to silica is between 1 MeO:1.5 SiO$_2$ and 1 MeO:4 SiO$_2$. The addition of small amounts of a sulfation product of a higher aliphatic alcohol greatly modifies the physical properties of alkali metal silicate solutions of the above compositions.

The sulfation products referred to herein are obtained by reacting with concentrated sulfuric acid, oleum, chlorsulfonic acid or other sulfuric acid derivatives of strongly sulfonating properties upon aliphatic alcohols or esters containing more than 7 carbon atoms in the alcoholic radical. According to the best experimental evidence available the sulfation products of the alcohols are sulfuric acid esters of the probable formula R—O—SO$_3$H with the possible production of minor amounts of sulfonic acids. When sulfating esters of unsaturated alcohols the sulfuric acid adds itself to the double bond but the evidence available is insufficient to decide if the products are sulfuric acid esters, sulfonic acids or a mixture of such compounds. As far as applicability in my invention is concerned, the reaction products obtained by the action of the sulfuric acid etc. upon the alcohols or upon the unsaturated esters are entirely equivalent and for purposes of my invention I choose to call these products the sulfates of aliphatic compounds having an alcoholic radical of more than 7 carbon atoms, the presence of an aliphatic alcoholic hydrocarbon radical of more than 7 carbon atoms and a salt forming sulfur-oxygen group in the molecule being the determinants for the availability of a given compound for addition to silicate solutions.

The higher alcohols from which the sulfates useful in my invention are derived are, for instance, oleyl, stearyl, cetyl, lauryl, mesitoyl, carnaubyl, melissyl, etc. alcohols, their mixtures and esters or ethers such as acetyl-octyl alcohol, stearoglyceryl ether, oleo glyceryl ether, palmetto glyceryl ether, etc. Similarly other higher alcohols which can be obtained by hydrogenation of fatty acids and their esters or by high pressure hydrogenation of carbon monoxide are, when sulfated, very useful addition agents to alkali metal silicate solutions according to my invention. Particularly useful are, however, the sulfates obtained from primary alcohols and their oxygen derivatives in which the alcoholic hydrocarbon radical contains from 8 to 18 carbon atoms inclusive.

These sulfates form water soluble alkali metal, ammonia and amine salts, etc. and it is in the form of such salts that they are most conveniently added to silicate solutions. It will, however, be understood that the free sulfates themselves can be added to the silicate solutions which, due to their alkalinity, form the corresponding salts.

The amounts of sulfates which are required to modify the properties of alkali metal silicate solutions is relatively small, from $\frac{1}{10}$ of 1% to 1% based on the weight of the solution produces the maximum effect, larger amounts can naturally be added but for economical reasons such larger amounts are entirely unnecessary.

We also found that contrary to the experience with ordinary electrolytes the sulfates of higher alcohols do not precipitate silica from the silicate solutions, particularly if their amounts contained in the solutions do not exceed about 2% of the weight of the solution.

The properties of the silicate solutions which are modified to a greater or lesser degree by the presence of small amounts of the sulfates of higher alcohols are their viscosity, surface tension, drying and solidifying characteristics, their penetration into porous or absorbent surfaces whereby their properties for adhesive and coating purposes are greatly improved.

Our novel compositions are intended for use in various fields in which improved spreading, penetrating and adhesive properties are particularly advantageous. For example, it is known that in applying sound-deadening board, such as fibre board, to sheet metal partitions ordinary sodium silicate solutions will not completely and readily wet the metallic surfaces, whereby a relatively poor bond between the steel and the fibre board is obtained. Our new silicate compositions containing small amounts of a sulfation product of an alcohol having more than 7 carbon atoms will readily wet steel and even painted steel surfaces and when used as an adhesive produce an excellent bond between steel and fibre board.

Similarly in the use of silicate solutions for adhesive purposes in the manufacture of multiply or corrugated boards from highly sized plies, we found that the presence of small amounts of sulfation products of higher alcohols greatly improves the adhesive properties of the silicate due to better penetration of the silicate through the size.

Our modified silicate solutions are likewise very useful for coating metallic surfaces for protective purposes. They adhere and spread much more uniformly over such surfaces than do ordinary silicate solutions. On drying they form uniform films of perfect adhesion.

The improvements in adhesive and film forming properties shown by our modified silicate solutions are not affected in compositions where the solutions are mixed with thickening agents such as starch, colloidal clays, flour, soya bean meal or other agents commonly used with silicates to modify their consistency.

The improvements in adhesive properties of our modified silicate solutions are difficult of measurement but the changes in surface tension, which is, however, not the only property determining the usefulness of our compositions, can easily be shown by laboratory tests.

The determination of surface tensions are conveniently made by the standard DuNouy tensiometer as described, for instance, on page 72 of "Laboratory Manual of Colloid Chemistry" in 1928, by H. N. Holmes. The figures obtained in such tests are given as dynes per centimeter at 28° C. It was found necessary in using this test on concentrated silicate solutions to dilute with water to prevent the formation of surface films which would otherwise interfere with the tests. The results of the tests shown below were obtained on solutions of a specific gravity greater than about 35° Bé. which had been diluted in the proportion of 2 parts by weight of the solution with 3 parts by weight of water.

Another simple laboratory test which gives indications as to the differences in properties between alkali metal silicate solutions free from or containing small amounts of sulfates of higher alcohols consists in dropping a measured amount of the solution upon a metallic, water repellant surface, measuring the surface covered by the solution, drying the solution and remeasuring the surface covered by the dried film. Films from straight silicate solutions show a considerable shrinkage, whereas films obtained from our modified silicate solutions cover substantially the same area as the solution.

The following table gives results of the above two tests made with a 42.5° Bé. sodium silicate solution of a $Na_2O:SiO_2$ ratio of 1:3.25.

| Addition agent | Amount used, percent | Surface tension in dynes/cm. | Percent of area covered after drying |
|---|---|---|---|
| None | | 68.0 | 50 |
| Oleyl sodium sulfate | 0.25 | 32.5 | 100 |
| Cetyl sulfuric ester | .25 | 31.5 | 100 |

With other sulfates of higher aliphatic alcohols containing more than 7 carbon atoms in the molecule and with other concentrated silicate solutions of the compositions specified, similar reductions of the surface tension will be shown in this test and the above results are merely given as illustrative of the test which can be applied to our modified solutions.

We claim:

1. An adhesive and coating composition comprising an aqueous solution of an alkali metal silicate of a composition between the limits of about 1 $Me_2O:1.5$ $SiO_2$ and 1 $Me_2O:4$ $SiO_2$ in which Me stands for an alkali metal containing not more than about 1% of the weight of said solution of a sulfate of an aliphatic compound containing an alcoholic hydrocarbon radical of more than 7 carbon atoms.

2. An adhesive and coating composition comprising an aqueous concentrated sodium silicate solution of a composition between the limits of about 1 $Na_2O:1.5$ $SiO_2$ and 1 $Na_2O:4$ $SiO_2$ containing not more than about 1% of the weight of said solution of a sulfate of an aliphatic compound containing an alcoholic hydrocarbon radical of more than 7 carbon atoms.

3. An adhesive and coating composition comprising an aqueous concentrated sodium silicate solution of a composition between the limits of about 1 $Na_2O:1.5$ $SiO_2$ and 1 $Na_2O:4$ $SiO_2$ containing not more than about 1% of the weight of said solution of a sulfate of a primary alcohol of from 8 to 18 carbon atoms inclusive.

PAUL C. LEMMERMAN.
WILLIAM K. SCHWEITZER.